United States Patent [19]

Ernst et al.

[11] Patent Number: 4,611,329
[45] Date of Patent: Sep. 9, 1986

[54] GAS LASER

[75] Inventors: Volker Ernst, Neu Esting; Hans Opower, Krailing, both of Fed. Rep. of Germany

[73] Assignee: W. C. Heraeus GmbH, Hanau, Fed. Rep. of Germany

[21] Appl. No.: 654,383

[22] Filed: Sep. 25, 1984

[30] Foreign Application Priority Data

Dec. 1, 1983 [DE] Fed. Rep. of Germany ....... 3343488

[51] Int. Cl.⁴ ............................................. H01S 3/097
[52] U.S. Cl. ...................................... 372/88; 372/87; 372/34; 372/61
[58] Field of Search ................ 372/88, 87, 61, 55, 372/34, 92

[56] References Cited

U.S. PATENT DOCUMENTS 3,172,057 3/1965 Bennett ................................. 372/55

Primary Examiner—Léon Scott, Jr.
Attorney, Agent, or Firm—Felfe & Lynch

[57] ABSTRACT

Gas laser of circular cross section perpendicular to the direction of beam propagation, having an optical resonator. The laser has, for continuous or modulated continuous beam operation, a tube as the inner electrode (2), which is connected to a high-frequency voltage source. The outer electrode (4) likewise comprises a tube which is disposed coaxially with the inner electrode (2). Between the two electrodes (2, 4) is the annular excitation chamber (3). The tube wall serving as outer electrode (4) is provided with slot-like cavities (1) which are open toward the excitation chamber (3) and serve for the cooling of the gas therein.

15 Claims, 3 Drawing Figures

GAS LASER

BACKGROUND OF THE INVENTION

The invention relates to an electrically excited gas laser of circular cross section perpendicular to the direction of beam propagation, whose excitation chamber is defined by two concentric tube walls which serve simultaneously as electrodes for the gas discharge, the outer electrode preferably being at ground potential.

Gas lasers of circular cross section perpendicular to the direction of beam propagation are disclosed as pulsed carbon dioxide lasers in German Pat. No. 29 19 708. Such lasers are characterized by a particularly compact structure of the excitation chamber. Since the outer tube wall serving as an electrode is at ground potential, the electrical security of the system can be accomplished in a simple manner, as in the case of a coaxial cable.

It is an object of the invention to improve the known laser design in order to reliably assure a continuous or modulated-continuous beam operation and to improve the cooling of the heated laser gas by means of the external tube wall.

SUMMARY OF THE INVENTION

This object is achieved by the fact that the external tube wall has, on its inside, cavities in the form of slots lying side by side, which open towards the excitation chamber.

An important advantage of the invention is to be seen in the fact that the depth of the slot-like cavities is considerably greater than their width. On account of the greatly increased wall surface area, the gas undergoes an intensive heat exchange. The cooling of the grounded external tube wall can be accomplished in a simple manner without the occurrence of any electrical potentials. The slot-like cavities are configured such that the gas heated in the excitation chamber and cooled in the cavities can be circulated. At the same time the normal diffusion is assisted by gas convection currents.

In a preferred embodiment, the cavities are groove-like recesses on the inside of the outer tube, which can be in the form of annular, longitudinal, or helical grooves.

In accordance with the invention, an electrically excited gas laser of circular cross section perpendicular to the direction of beam propagation comprises an excitation chamber bounded by two concentric tube walls which serve simultaneously as electrodes for the gas discharge. The outer tube wall has, on its inside, cavities in the form of slots disposed side-by-side, which are open toward the excitation chamber.

For a better understanding of the present invention, together with other and further objects thereof, reference is made to the following description, taken in connection with the accompanying drawings, and its scope will be pointed out in the appended claims.

DESCRIPTION OF THE PREFERRED EMBODIMENTS

Figure 1:
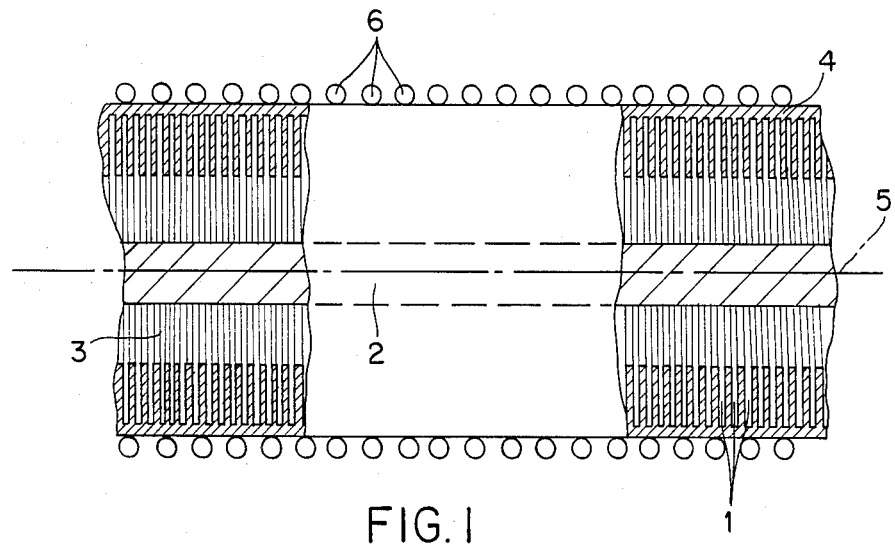
FIG. 1 is a fragmentary diagrammatic, vertical sectional view through a portion of the excitation chamber of a gas laser of circular cross section in which the slot-like cavities are in the form of annular grooves.

Referring now more particularly to FIG. 1 of the drawings, FIG. 1 shows a vertical section through the gas laser of the invention for continuous or modulated-continuous beam operation. The concentric arrangement represented in a cross section through the longitudinal axis 5 has a tube as inner electrode 2, which is connected to a high-frequency voltage source which is not represented here. The external electrode 4 likewise comprises a tube, and it is provided on the inside surface of the tube wall with the slot-like cavities 1 in accordance with the invention, in the form of circumferential annular grooves which open toward the excitation chamber. The excitation chamber 3 is defined radially by the tube walls of the electrodes 2 and 4, while in the axial direction it is sealed off hermetically by optical mirrors, which are not shown, as well as by an additional casing cover, if desired. The electrode 4 preferably is at ground potential; it preferably is provided on its exterior with a cooling means—preferably in the form of a cooling coil 6.

The structure represented in FIG. 1 is preferably used in a gas laser whose longitudinal axis 5 is in the horizontal position, and thus the gases heated in the excitation chamber can circulate on a closed course as a result of the annular grooves 1.

The preferred ratio of the width to the depth of the grooves amounts to approximately 1:9. To achieve the best possible coordination between the flow and the heat exchange surface, however, the ratio can be from 1:5 to 1:20, depending on the particular application. The ratio of groove width to groove depth that is selected as the optimum, however, preferably is then the same over the entire longitudinal axis.

The thicknesses of the separating walls between two adjacent grooves preferably are approximately the same as the groove width, so that the ratio of the wall thickness to the groove width preferably is approximately 1:1. It is also possible, however, to adapt the wall thickness between two adjacent slots to the slot width to the particular application within the range of 5:1 to 1:5. The ratio once selected preferably is then constant over the entire length of the tube wall.

Figure 2:
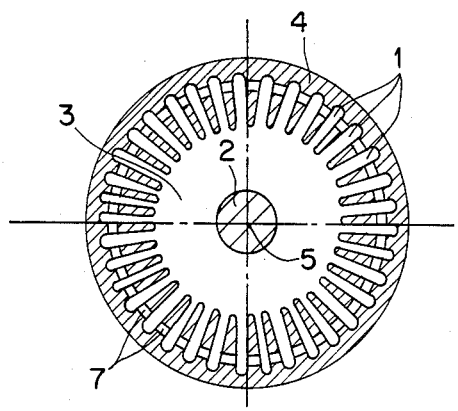
FIG. 2 is a diagrammatic, cross-sectional view through a gas laser excitation chamber in which the external tube wall is provided with longitudinal grooves.

FIG. 2 shows in cross section a laser system having cavities 1 disposed segmentally about the internal electrode 2 and arranged in the form of longitudinal grooves in the external electrode 4 at uniform intervals. The longitudinal grooves run parallel to the longitudinal axis over the entire length of the inside surface of the external tube wall of the electrode 4. Such a system is used preferably when the longitudinal axis 5 is disposed vertically. In this embodiment, too, the ratio of the groove width to the groove depth preferably is 1:9. Here, again, however, the ratio can be adapted to the particular application in a range from 1:5 to 1:20. The thickness of the separating wall between two adjacent grooves preferably corresponds approximately to the groove width, so that the ratio of wall thickness to groove width preferably is 1:1. The ratio of wall thickness to groove width, however, can be optimized in the range from 5:1 to 1:5, depending on the application.

A substantial improvement of the cooling action can be achieved by varying the groove width in the radial direction, by reducing the groove width toward the tube axis 5. In this manner the gas particles in the area of the groove base thus widened cool especially fast on account of the enlarged heat exchange surface adjacent to the external cooling.

A further improvement of the convection flow is achieved by providing the slotted wall separating the slot-like cavities 1 with passages 7 in the region of its base. The passages 7 in this case preferably are distributed over the entire circumference of the external electrode. They preferably extend in a plurality of circumferential rows arranged parallel to one another over the entire length of the external electrode 4.

Figure 3:
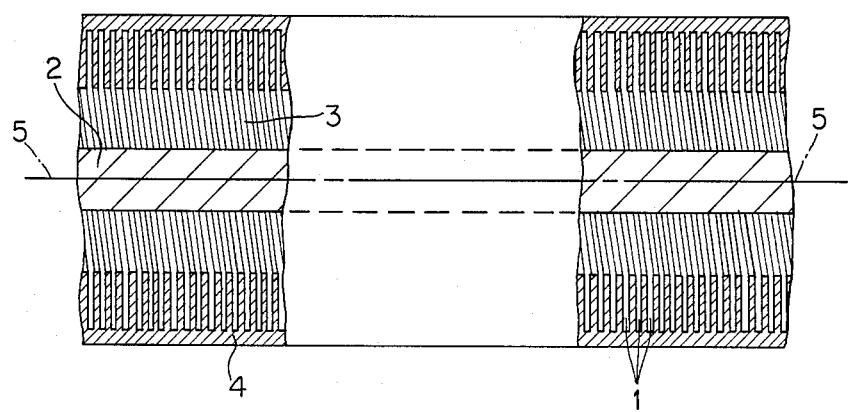
FIG. 3 is a fragmentary diagrammatic, vertical sectional view through a portion of the excitation chamber with cavities in the form of helices.

FIG. 3 shows in longitudinal section a system in which the slot-like cavities 1 are disposed in the form of helices about the longitudinal axis in the tube wall of the electrode 4. In this embodiment, too, cooling of the external wall of the external electrode 4 preferably is provided. Such laser systems are used preferably for all-position applications.

The slot-like cavities are arranged according to the principle of a multiple-threaded screw. In this embodiment the ratio of groove width to groove depth preferably is approximately 1:10. Of course, it is possible, as in the embodiments represented in FIGS. 1 and 2, to adapt the ratio to the particular application within the range from 1:5 to 1:20. Further, in the embodiment represented in FIG. 3, there is the possibility of varying the pitch of the helices to achieve an optimum gas flow. Preferably the pitch angle amounts to about 30°. The ratio of groove spacing to groove width preferably is approximately 1:1.

Intensified convection can be achieved by superimposing an additional field of force on the gravitational field. A centrifugal acceleration field which is produced by rotating the outer circumference of the electrode 4 provided with the helical grooves can serve as such a force field.

In such a system, preferably only the outer circumference of electrode 4 is rotated, while the rest of the system with the inner electrode 2, its power feed and its gas feed is stationary.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrically excited gas laser of circular cross section perpendicular to the direction of beam propagation, including:
an excitation chamber bounded by two concentric tube walls which serve simultaneously as electrodes for the gas discharge, and the outer tube wall having, on its inside, cavities in the form of slots disposed side-by-side, which are open toward the excitation chamber.

2. A gas laser in accordance with claim 1, in which the depth of said cavities is greater than their slot width.

3. A gas laser in accordance with claim 2, in which the ratio of slot width to cavity depth ranges from 1:5 to 1:20.

4. A gas laser in accordance with claim 1, in which two adjacent slots are separated by a wall and the ratio of the separating wall thickness between two adjacent slots to the slot width is in the range from 5:1 to 1:5.

5. A gas laser in accordance with claim 4, in which the ratio of the distance between slots to the slot width is constant over the entire length of said outer tube wall.

6. A gas laser in accordance with claim 1, in which said cavities are in the form of circumferential annular grooves on the inside of said outer tube wall.

7. A gas laser in accordance with claim 1, in which said cavities are in the form of longitudinal grooves extending parallel to the longitudinal axis of said concentric tube walls.

8. A gas laser in accordance with claim 7, in which the groove width diminishes in the radial direction toward said axis.

9. A gas laser in accordance with claim 1, in which two adjacent slots are separated by a slot wall and said slot wall is provided with passages in the region of the bottom thereof.

10. A gas laser in accordance with claim 1, in which said cavities extend in the form of helices about the longitudinal axis of said concentric tube walls.

11. A gas laser in accordance with claim 10, in which said cavities are disposed similarly to thread recesses of a multiple-thread screw.

12. A gas laser in accordance with claim 11, in which said outer tube wall is rotatable about its longitudinal axis.

13. A gas laser in accordance with claim 1, which includes means for cooling the outer surface of said outer tube wall.

14. A gas laser in accordance with claim 13, in which said cooling means comprises a cooling coil.

15. A gas laser in accordance with claim 1, in which said outer tube wall is at ground potential.

* * * * *